US007193931B2

(12) United States Patent
Pyle

(10) Patent No.: US 7,193,931 B2
(45) Date of Patent: Mar. 20, 2007

(54) SYSTEM AND METHOD FOR SYNCHRONOUS SAMPLING AND ASYNCHRONOUS TRANSFER OF DATA WITH CONNECTIONLESS POWERING AND CONTROL OF DATA LINK SUBSYSTEMS

(75) Inventor: Jeffrey S. Pyle, Phoenix, NY (US)

(73) Assignee: Lockheed Martin Corporation, Bethesda, MA (US)

( * ) Notice: Subject to any disclaimer, the term of this patent is extended or adjusted under 35 U.S.C. 154(b) by 224 days.

(21) Appl. No.: 10/756,860

(22) Filed: Jan. 14, 2004

(65) Prior Publication Data

US 2005/0152221 A1 Jul. 14, 2005

(51) Int. Cl.
*G01V 1/22* (2006.01)

(52) U.S. Cl. .......................................... 367/20; 367/76

(58) Field of Classification Search .................. 367/20, 367/76, 78, 79, 80, 153, 154
See application file for complete search history.

(56) References Cited

U.S. PATENT DOCUMENTS 3,748,638 A * 7/1973 Montgomery et al. ........ 367/79
4,092,629 A * 5/1978 Siems et al. .................. 367/79
4,375,089 A * 2/1983 Thigpen et al. ............... 367/20
4,912,684 A * 3/1990 Fowler ........................ 367/76
5,200,930 A * 4/1993 Rouquette .................... 367/76
6,091,670 A * 7/2000 Oliver et al. ................ 367/76

* cited by examiner

*Primary Examiner*—Ian J. Lobo
(74) *Attorney, Agent, or Firm*—George R. McGuire; Bond, Schoeneck & King PLLC

(57) ABSTRACT

A system and method for measuring the value of a parameter, e.g. sound energy, at a plurality of spaced locations using electrically powered microcells positioned at each of the locations and for transmitting RF signals commensurate with control and measurement data between a control node and the microcells, all without physical connection of a wiring harness, or the like, for either powering or signaling. The microcells and control node are mounted to an elongated, tubular member through which a single, insulated conductor and a coaxial cable in coupled mode extend, in proximity to the spaced microcells. The insulated conductor is connected to a source of AC power and passes through the open centers of current transformers which inductively couple the AC power to each microcell. A phase locked loop at each microcell controls the frequency of the AC power provided to the sensing element, thereby controlling the sampling rate. Signals are transmitted by the control node and carried by the coaxial cable and are received by appropriate RF equipment at each microcell to identify such things as the identity of the particular microcell being interrogated, packet size, data rates, acoustic data, etc. A federated radio system at the microcells transmits the requested data for reception at the control node and relay to an end user. This approach permits the supply of power, control of sampling rates and transfer of data in an essentially connectionless manner, thereby obviating many of the failures typically experienced with prior systems.

15 Claims, 6 Drawing Sheets

SYSTEM AND METHOD FOR SYNCHRONOUS SAMPLING AND ASYNCHRONOUS TRANSFER OF DATA WITH CONNECTIONLESS POWERING AND CONTROL OF DATA LINK SUBSYSTEMS

BACKGROUND OF THE INVENTION

The present invention relates to collection and transmission of data corresponding to one or more physical, electrical, environmental, or other parameters at discrete points over an area where discernment of such parameters is desired. More particularly, the invention relates to improvements in the electrical powering and control of subsystems having a plurality of sensor arrays for responding to stimuli present at such arrays and for transmitting RF signals commensurate with the stimuli to an end user.

Current systems for measuring parameters such as sound wave energy over a designated area include so-called Towed Array hoses wherein an elongated tube or cylinder containing a plurality of acoustic sensing devices in spaced relation along its length is towed behind a ship or other moving vehicle. The sensing devices comprise appropriate transducers for converting the acoustic energy to commensurate electrical signals capable of radio transmission. Direct electrical connection between the power source and the physical layer within such acoustic arrays is required for supplying electrical power to the acoustic and non-acoustic subsystems; direct connection is also required for data transfer telemetry sub-systems. These connection points and interconnecting wiring harnesses are subject to failure. In fact, the majority of non-operational failures in such systems appear to be the result of damage to conductors and/or physical connections.

It is a principal object of the present invention to provide systems and methods of improving reliability of communications and power links within parameter sensing and transmission subsystems.

Another object is to improve scalability in data collection systems employing synchronous sampling of parameter values and asynchronous transmission of the collected data.

A further object is to provide an array of sensors for sampling the value of one or more variable parameters at a desired rate and transferring data commensurate with such values wherein electrical power, control of sampling rate and transfer of data are carried out without physical contact to any wiring harness.

Still another object is to provide a structural arrangement of elements for use in a towed array acoustic sensing system which results in improvements in reliability, scalability and manufacturing costs when compared with prior art systems of this type.

Other objects will be obvious and will in part appear hereinafter.

SUMMARY OF THE INVENTION

In furtherance of the foregoing objects, the invention comprises a physical support member, such as a length of cylindrical tubing of dielectric material, with a single, insulated, electrical conductor and a coaxial cable extending in spaced, substantially parallel relation through the tubing for all or most of its length. The tubing may be hollow, in the nature of a hose, or solid with the conductor and cable extending through the open, central part of the tubing or embedded in the dielectric material. The insulated conductor is surrounded by a plurality of toroidal coils forming current transformers at spaced positions along the length of the conductor. The insulated conductor is connected to a source of AC power and, when energized, provides potential energy across the terminals of the current transformers.

A plurality of microcells, preferably equal in number to the current transformers, is also mounted to the tubing, within the hollow central portions or embedded in the material thereof. In the disclosed embodiment, each microcell includes a phase locked loop, an A/D converter and a sensor package, connected in series, with the terminals of the current transformer providing an input to the phase locked loop which is a function of the wave form on the insulated conductor. Each microcell further includes an induction power regulator which receives power from the terminals of the current transformer and is connected to a control rectifier which, in turn, provides DC power to acoustic and non-acoustic subsystems of the microcell. The sensor package or array generates electrical signals in response to, and commensurate with, a parameter such as sound energy at the location of the array. The signals are stored in a local data storage device within the microcell and, upon command from a control node connected to the coaxial cable, are transmitted by a Federated Radio System (i.e., an RF transmitter with directional antenna associated with each microcell) for reception at a remote location where the parameter values at the respective sensor arrays are monitored. The coupled-mode coaxial cable is optimized to the frequency of the radio transmitters. The control node is mounted in the tubing structure and creates control information required for structured TDMA operation.

The foregoing and other features of the system and method of the invention will be more fully described and explained in the following detailed description, taken in conjunction with the accompanying drawings which are partly schematic and partly diagrammatic in content.

DETAILED DESCRIPTION

Figure 1A:
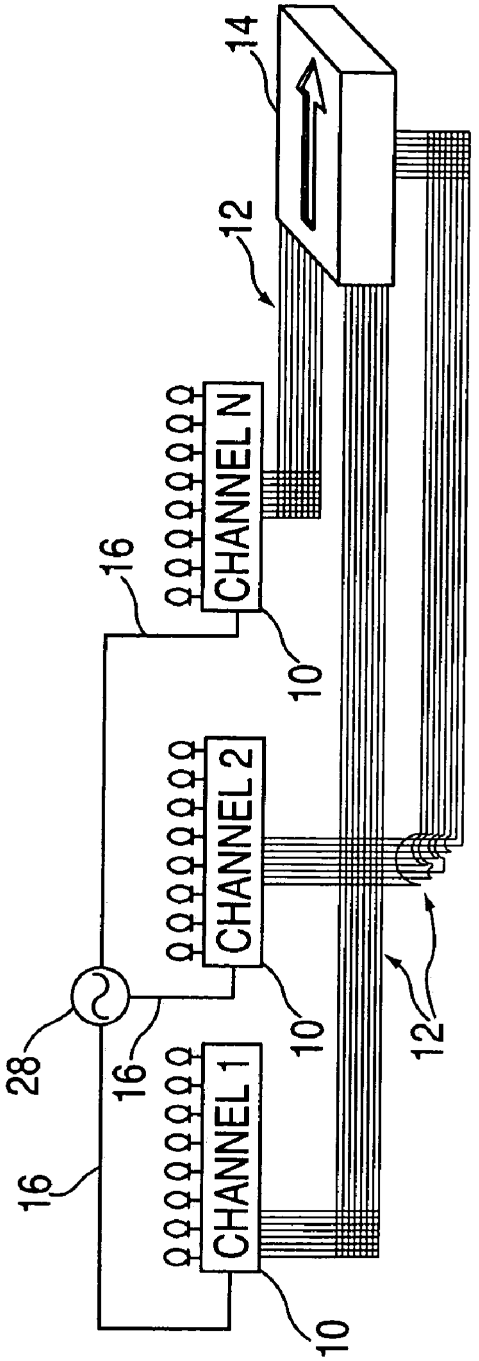
FIG. 1A (PRIOR ART)
FIGS. 1A and 1B are diagrammatic overviews of a typical prior art system and a system of the present invention, respectively, for purposes of direct comparison of the portions of each system which are of interest herein.

As stated, the invention is concerned with monitoring data associated with the condition or value of some variable parameter(s) in a designated location at discrete points in time. The present discussion will be directed to systems wherein the monitored parameter is sound energy, although it will be understood that more than one parameter may be monitored, and that the parameter may be something other than sound energy. At any rate, such monitoring systems have typically included a plurality of sensor arrays, arranged in channel groups such as those denoted in FIG. 1A by reference numeral 10, each physically connected by a wiring harness 12 to a multiplexer and/or hub 14. Each wiring harness 12 includes wires for power, signaling, etc. woven in the same harness. Clocking signals emanating from hub 14 are propagated along the wires of wiring harnesses 12 to synchronize sampling of the parameter value and transmission of electrical signals commensurate with the sensed values to hub 14. Thus, supply of power to the acoustic and non-acoustic subsystems of arrays 10, as well as control and transmission of data requires physical connection of a large number of individual wires to the sensor arrays and hub.

Figure 1B:
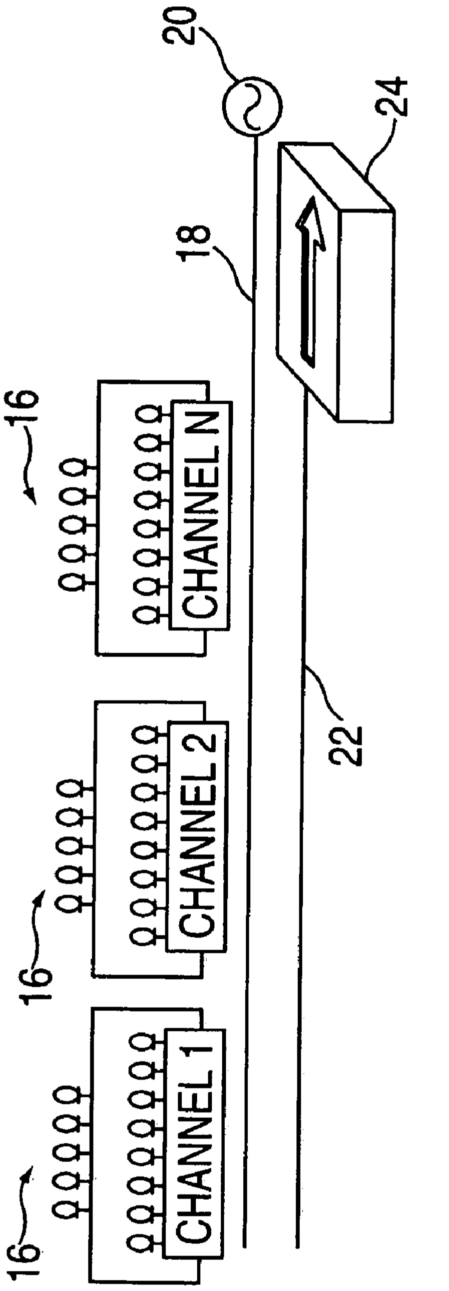

The present system, by contrast, does not require, nor does it employ, the physical connections of a wiring harness between the channel groups and hub for either power or signaling purposes. As shown in FIG. 1B, the system includes a plurality of channel groups and a hub, as in the prior system, but the wiring harness which physically connected these elements is replaced by a single, insulated conductor 18, connected at one end to main power supply 20, and a coaxial cable 22. The elements corresponding to channel groups 10 of FIG. 1A are termed "microcells" and denoted by reference number 16, and the element corresponding to hub 14 is termed "control node" 24, for reasons which will become apparent. Microcells 16 are inductively powered by current transformers (shown in FIGS. 3 and 4) having toroidal cores through which insulated conductor 18 passes, whereby power and synchronous sampling signals are provided from main power supply 20. Additionally, clocking and data signals are coupled into and out of trunking cable 22, a coaxial cable in coupled mode connected to control node 24, extending along the length of the towed array in close proximity to microcells 16.

Figure 2A:
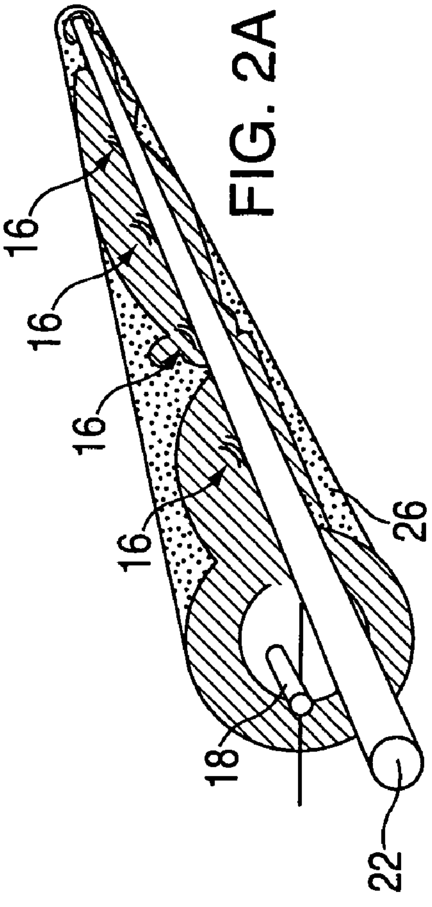
FIGS. 2A and 2B are illustrations of the general physical arrangement of elements in the disclosed example of the invention, shown in smaller scale and more general terms in FIG. 2A and larger scale with more detail in FIG. 2B.
Figure 2B:
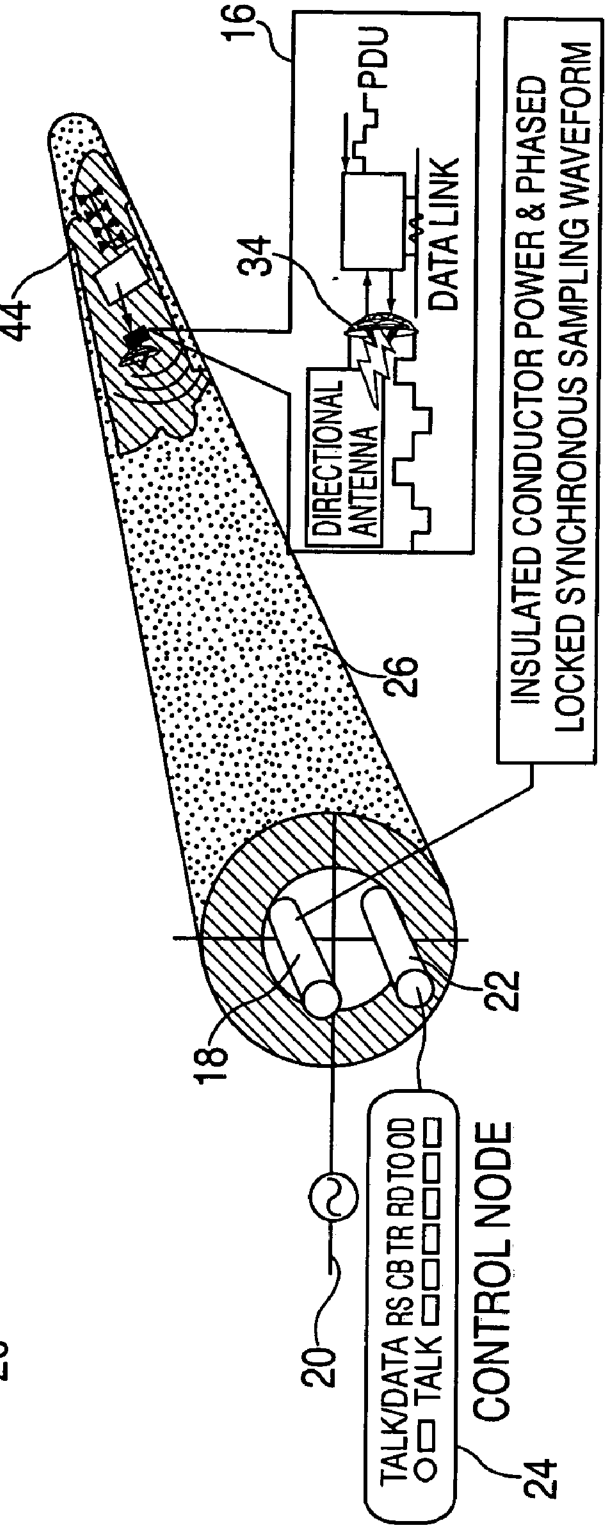

An example of a physical association of elements embodying the system of the present invention is shown in FIGS. 2A and 2B. Elongated tube 26, formed as a hollow, cylindrical body of a suitable, dielectric material, is adapted for connection to a towing vehicle or other movable object. Insulated conductor 18 and coupled mode coaxial cable 22 extend in spaced, parallel relation through the open, central part of tube 26 for all or most of its length. Conductor 18 is connected at one end to the main power supply 20, such as a conventional generator preferably located on or mounted to the towing vehicle, and coaxial cable 22 is connected to control node 24, preferably within or mounted to tube 26. As indicated in FIG. 2A, a plurality of identical microcells 16 are mounted in, or to tube 26, either within the open, central portion thereof or embedded in the material of the tube wall. That is, depending upon the preferred design, the elements may or may not be directly attached to the tube wall. Each of microcells 16, as shown in FIG. 2B, includes an RF transmitter with directional antenna 34 for conveying data in the form of pulse bursts of digital signals between control node 24 and microcells 16. The radios and other components of the several microcells 16 collectively make up what is known in the art as a Federated Radio System which, as will be seen, collect data in their respective locations synchronously and transmit such data asynchronously, i.e., when commanded to do so by control node 24.

Figure 3:
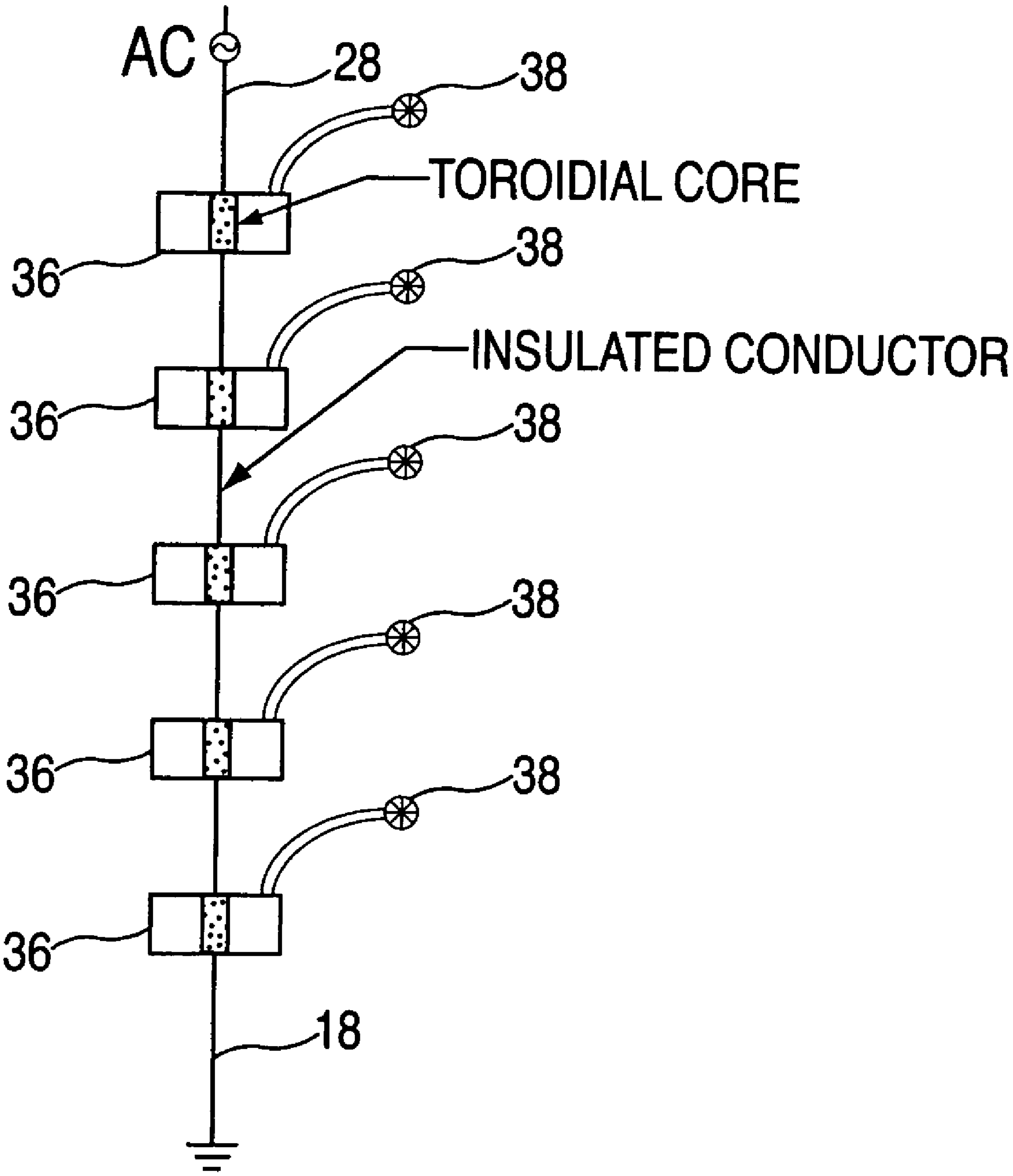
FIG. 3 illustrates one of the elements of FIGS. 2A and 2B in association with other elements.
Figure 4:
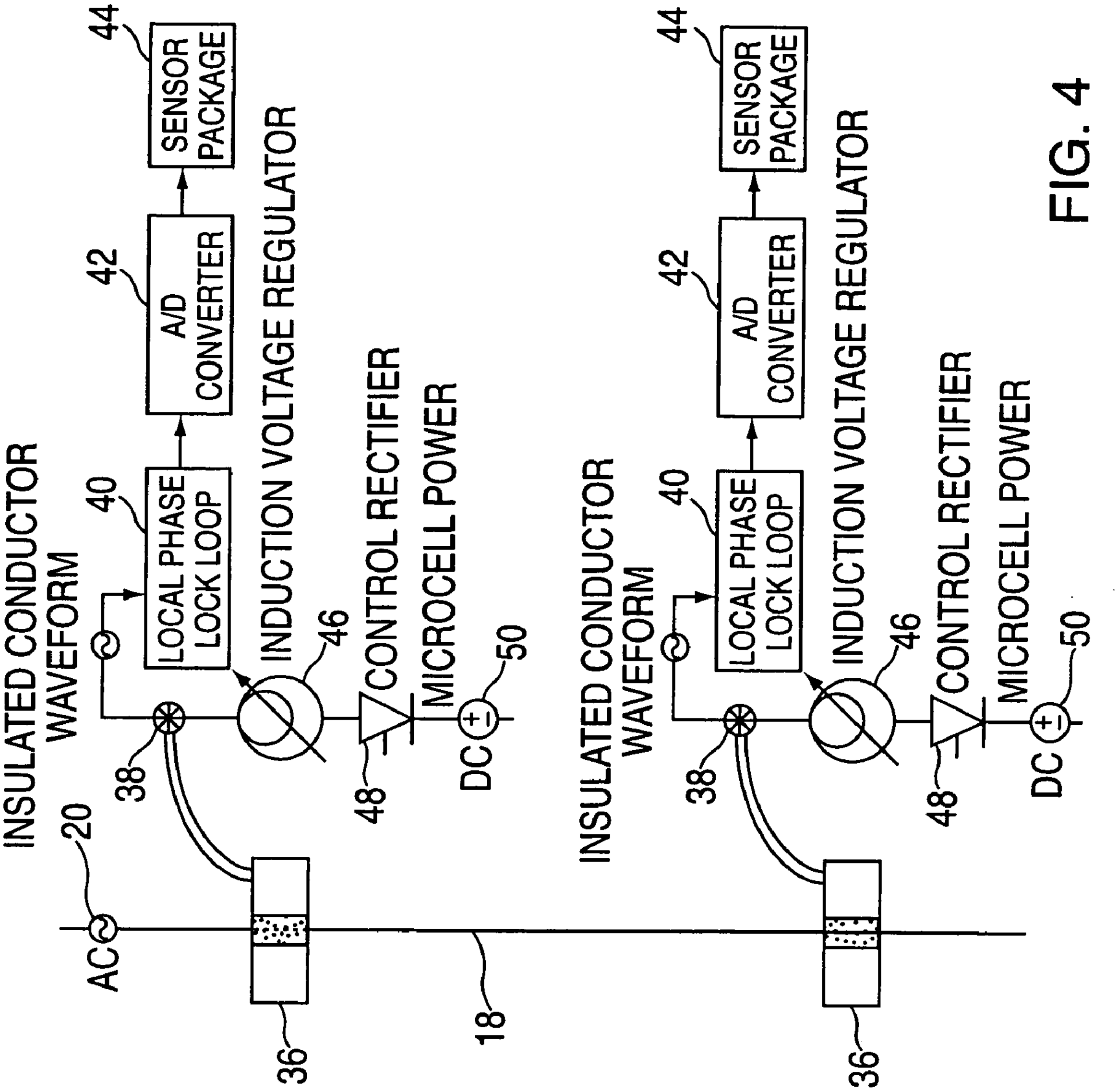
FIG. 4 is a portion of FIG. 3 shown in association with still more elements.

As shown in FIG. 3, insulated conductor 18 passes through the open centers of the toroidal windings of a plurality of current transformers 36, equal in number to the number of microcells 16. Thus, when conductor 18 is energized to carry AC current, potential energy, proportional in value to the value of the current on conductor 18, is available at terminals 38 of the windings. FIG. 4 illustrates two of the current transformers 36 and the connection of terminals 38 thereof to elements of microcells 16. Terminals 38 are connected to phase locked loop 40 which provides a signal to A/D converter 42 commensurate with the frequency of the AC waveform on conductor 18. The sensor group or array, e.g., a plurality of acoustic transducers, is indicated in FIGS. 2B and 4 by reference numeral 44 and receives signals from A/D converter 42. In this manner, the frequency of the AC on conductor 18 forms the basis of the sampling clock, that is, the sampling rate is controlled as a function of the design of phase locked loop 40. Terminals 38 are further connected to induction voltage regulator 46 and control rectifier 48 to provide DC power at terminal 50, thereby providing inductive (connectionless) powering of acoustic and non-acoustic subsystems. The foregoing description provides an operative embodiment of a circuit configuration and elements thereof suitable for use in the context of the present invention, although circuitry employing other elements will be apparent to those skilled in the art.

Figure 5:
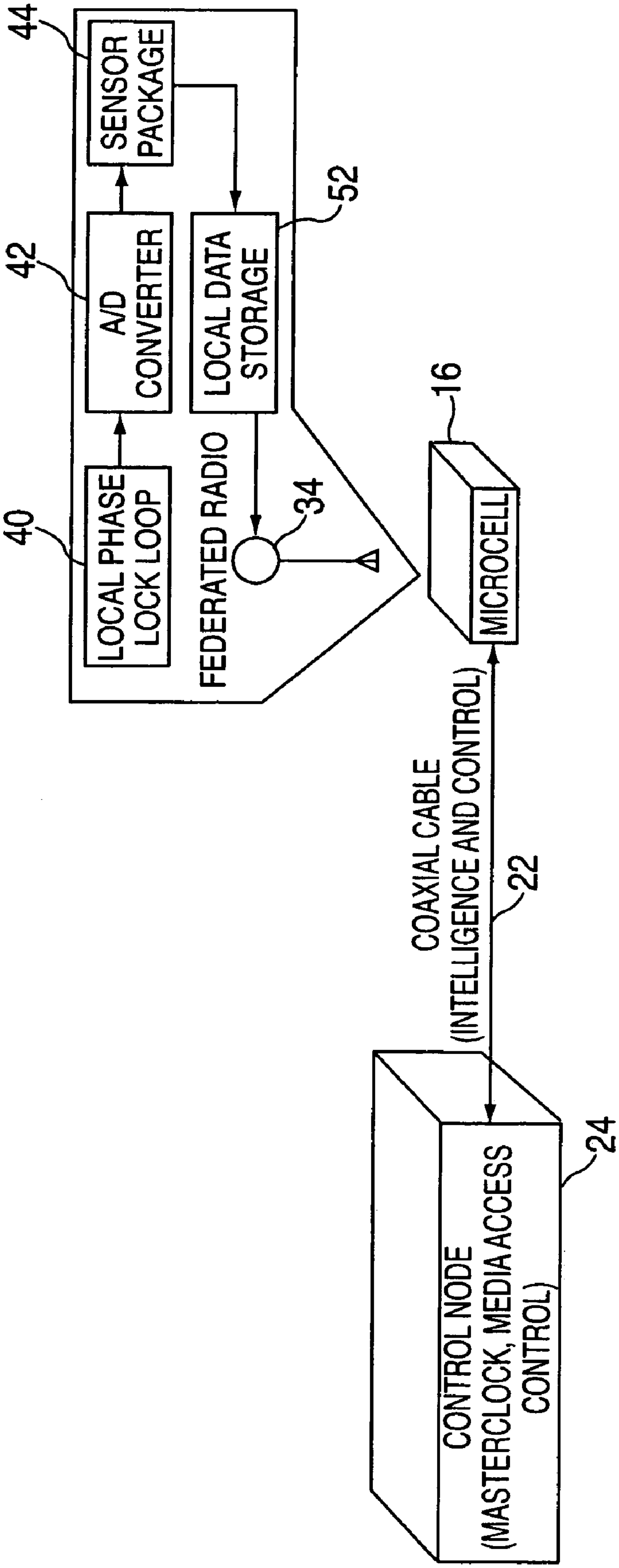
FIG. 5 illustrates the functional relationship between portions of previous Figures with an additional element.

Referring now to FIG. 5, the TDMA connectionless data transfer system comprises control node 24, coupled mode coaxial cable 22 and microcells 16. As previously stated, each of microcells 16 includes RF transmitter(s) 34 which make up the federated radio system. Connectionless data transfer is facilitated by the single, coupled mode, coaxial able 22 passing in proximity to the transmitters of each microcell and optimized to the frequency of the transmitters. RF signals carrying the acoustic and non-acoustic data are coupled into cable 22. The coupling efficiency is improved by designing the shield layer of cable 22 to permit a controlled amount of leakage and ingress. Data generated by sensor arrays 44 is stored locally, i.e., at each of microcells 16, in an appropriate memory device 52. Data generation and storage continues and remains passive until an activating signal is received from control node 24.

Figure 6:
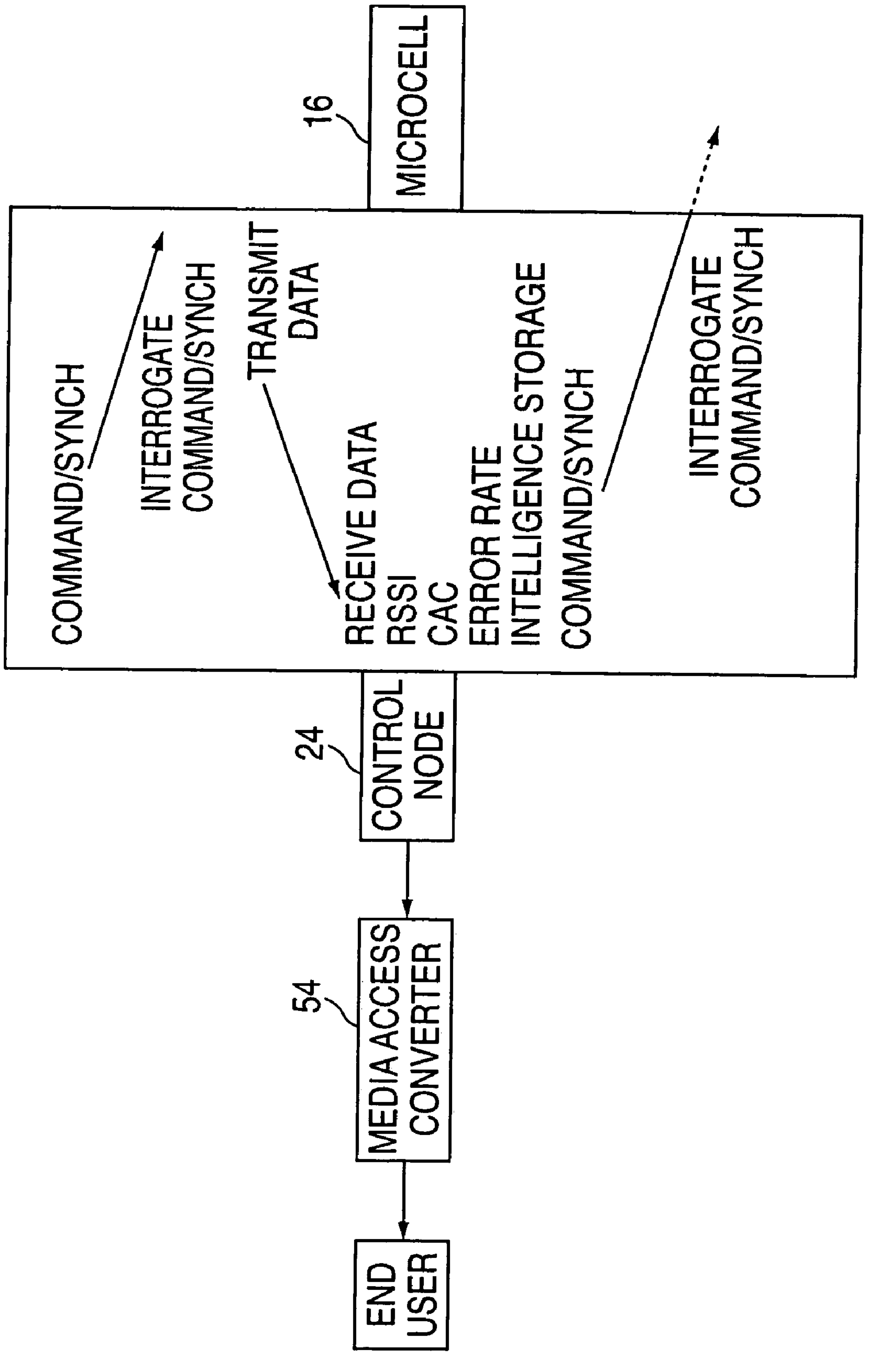
FIG. 6 illustrates flow of information between portions of the system.

A file is compiled with a unique identifying code assigned to each of microcells 16, as well as appropriate Section and Line Overhead. When it is desired to retrieve data from the system, the appropriate command is delivered to control node 24. Control node 24 sends a command/synch packet destined for the microcell 16 which has the desired data. This packet contains several lines, with each line representing a unique TDMA slot. Although all microcells receive the packet, each packet contains a microcell ID and the type of data it is to transmit (packet size, data rates, acoustic data values, etc.). Control node 24 parses the first line of the command file and sends a command/synch packet destined for the microcell specified in the command file. All microcells receive the packet and interrogate it for microcell ID. The microcell designated in the command file decodes the command and transmits the data requested in the command. Control node 24 receives the incoming data stream from the designated microcell, parses it and records the data which is then transferred to media access converter 54 for transmission to the end user. The next command file is then transmitted and the cycle is repeated. This dialog between control node 24, microcells 16 and media access converter 54 is basically as set forth in FIG. 6.

The control node and microcell software is designed to keep the two synchronized with all of the control being left up to the control node. This results in a self-synchronized TDMA data transfer system with the base TDMA slot determined by the combined processing delay of the control node, microcell and transmission latency. The invention provides electrical power and transmission of synchronously sampled sensor intelligence without conventional physical contact to transmission or powering media. Power is derived from the magnetic field surrounding a single, insulated conductor carrying AC current. The frequency of the signal on the conductor, which may be either CW or pulsed, is the locking signal for a phase locked loop for synchronous sampling by the speed sensor arrays.

What is claimed is:

1. A system for measurement of the value of a parameter at a plurality of spaced locations and for transmitting electrical signals commensurate with said parameter value to a position remote from said spaced locations, said system comprising:

a) an elongated member having an insulated conductor and a coaxial cable extending therein;

b) a plurality of sensing elements positioned in spaced relation along said elongated member with at least one of said sensor elements at each of said spaced locations, to generate electrical signals commensurate with said parameter value;

c) an electrical power source to which said a first end of said insulated conductor is in electrical communication; and d) means for inductively coupling said power source to said sensing elements to provide electrical power for operation of said sensing elements;

e) a control element for selective generation of electrical signals representing data to which said sensing elements are responsive; and f) wherein said electrical signals are communicated to said sensing elements over said coaxial cable.

2. The system of claim 1 wherein said means for inductively coupling comprise a plurality of current transformers encircling said insulated conductor.

3. The system of claim 2 wherein said current transformers include a toroidal core with open center through which said insulated conductor extends.

4. The system of claim 3 and further including data storage means associated with each of said sensing elements.

5. The system of claim 1 wherein said coaxial cable is in coupled mode.

6. The system of claim 5 wherein said coaxial cable extends along at least a portion of the length of said elongated member.

7. The system of claim 6 wherein said means for inductively coupling comprises a plurality of current transformers, and wherein said insulated conductor and said coaxial cable extend in substantially parallel relation along said elongated member.

8. The system of claim 7 and further including a control node to which said coaxial cable is connected and wherein each of said sensing elements include RF receiving and transmitting means for transfer of data in the form of RF signals between said coaxial cable and said sensing elements.

9. The system of claim 8 wherein said power source provides AC power to said conductor, and wherein each of said sensing elements further includes a phase locked loop to control the frequency of the AC power and thereby the frequency of generation of said electrical signals.

10. The method of measuring the value of a predetermined parameter at a plurality of locations spaced along the length of an elongated member suited for towing behind a moving vehicle, said method comprising:

a) positioning a sensing element adapted to generate electrical signals commensurate with said parameter value at each of said plurality of locations;

b) providing a source of electrical power;

c) inductively coupling said source of electrical power to each of said sensing elements via an insulated conductor to provide electrical power for operation thereof, d) positioning a coaxial cable to extend in proximity to each of said sensing elements; and e) transmitting said electrical signals via said coaxial cable to a remote location for receipt by an end user.

11. The method of claim 10 wherein said inductively coupling comprises providing a plurality of current transformers, each having a toroidal core with open center, and with said insulated conductor passing through said open center of each of said cores.

12. The method of claim 11 wherein said coaxial cable is in coupled mode.

13. The method of claim 10 wherein said sensing elements are powered solely by said inductive coupling to said power source.

14. The method of claim 13 wherein said sensing elements include RF receiving and transmitting capability, and farther including connecting to said coaxial cable a control node having selectively operable signal generating capability for actuating any selected one of said sensing elements to transmit, via said coaxial cable, said signals commensurate with said parameter value.

15. The method of claim 14 wherein said power source generates AC power, and comprising the farther steps of controlling the frequency of said AC power by a phase locked loop at each of said sensing elements and repeatedly generating said electrical signals at a rate commensurate with said controlled frequency.

* * * * *

UNITED STATES PATENT AND TRADEMARK OFFICE
CERTIFICATE OF CORRECTION

PATENT NO. : 7,193,931 B2 
APPLICATION NO. : 10/756860
DATED : March 20, 2007
INVENTOR(S) : Jeffrey S. Pyle It is certified that error appears in the above-identified patent and that said Letters Patent is hereby corrected as shown below:

Col. 5,
Claim 1. c), line 1, delete “said”.

Signed and Sealed this

Twenty-second Day of May, 2007

JON W. DUDAS
*Director of the United States Patent and Trademark Office*